United States Patent [19]

Haney et al.

[11] 4,042,327
[45] Aug. 16, 1977

[54] ION-PAIRING CHROMATOGRAPHY

[75] Inventors: William G. Haney, Shawnee Mission, Kans.; Douglas P. Wittmer, Milford, Mass.

[73] Assignee: Waters Associates, Inc., Milford, Mass.

[21] Appl. No.: 649,365

[22] Filed: Jan. 15, 1976

[51] Int. Cl.$^2$ .............................................. G01N 31/08
[52] U.S. Cl. ................................ 23/230 R; 23/230 B; 73/61.1 C; 210/31 C
[58] Field of Search .......................... 23/230 R, 230 B; 210/31 C; 73/61.1 C

[56] References Cited
PUBLICATIONS

"Bonded Stationary Phases in Chromatography," Eli Grushka, ed., Ann Arbor Science, Ann Arbor, Mich., 1974.

Primary Examiner—R.E. Serwin
Assistant Examiner—Sidney Marantz
Attorney, Agent, or Firm—Robert A. Cesari; John F. McKenna; Andrew F. Kehoe

[57] ABSTRACT

Liquid chromatographic processing of compositions containing ionizable compounds. The chromatographic column is formed of a stationary packing having a chemical group chemically bonded thereto and a counter ion is added to the polar mobile liquid. The counter ion forms a reversible complex with at least one characterizing radical of at least one of the ionizable compounds.

17 Claims, No Drawings 4,042,327

ION-PAIRING CHROMATOGRAPHY

BACKGROUND OF THE INVENTION

This invention related to liquid chromatography and more particularly to liquid chromatographic processes for analysis for ionizing materials such as acids, bases, and amphoteric materials.

Liquid chromatography is a process used increasingly in analytical and preparative chemistry, whereby a stationary porous material is held in a chamber, such as a long column, while a mobile liquid material is passed through the porous material. In a typical case, the stationary material is a solid support, e.g. an inert powder coated with a stationary liquid agent or having a chemical agent bonded to the surface thereof. Various distinct chemical compounds contained in a carrier liquid (which usually forms the bulk of the mobile liquid) have varying affinities for the stationary liquid agent. Consequently, as the mobile liquid moves through a chromatographic column, the various chemical compounds are, as a consequence of their different affinities, delayed varying times by their contact with the stationary agent or with the chemically-bonded agent. Thus, various chemicals emerge from the column at different times and are detected individually by a refractometer, an ultra-violet light absorbtometer, or some other such analytical apparatus into which the liquid flows on leaving the chromatographic column.

Special techniques have been applied to analysis or samples containing ionic materials. In general, all of these techniques utilize the equilibrium between (a) a sample-bourne ion in the mobile phase and (b) its non-ionic form wherein it is joined to a counter ion to achieve a retarding of the movement of the sample-bourne ion as it moves down the column.

The more common of these techniques is that known as "ion exchange." In that process, the stationary phase is an ionic material, which may be called an ion exchange resin, characterized by the presence of a counter ion which will readily exchange with an ion of a compound in the sample being ionized. The conditions are generally selected so that, theoretically, there is to be no net change in the condition of the ion exchange packing during the analytical procedure. In most practical situations, however, there is a substantial modification of the exchange resin over a period of time.

Some problems with such ion exchange columns of the type described include: (1) A poorer resolution of ionic components within a sample than is desired in many cases; (2) An undesirably short life because the packing tends to become contaminated and damaged by the buffered solutions required to regenerate its ion exchange potential; (3) Ion exchange columns, in order to maximize their limited analytical potential, often require the use of relatively expensive gradient elution apparatus and procedures. The second-listed disadvantage often can be remedied by preliminary purification of the sample; but, that, too, is often an expensive, time-consuming operation.

It is noted that a substantial amount of art relating to ion-exchange processes is disclosed in U.S. Pat. Nos. 3,915,642 and 3,918,906.

Another chromatographic process has been used in analysis of ionic compounds. It utilizes that species of chromatographic process known as liquid-liquid partition chromatography. This type of process utilizes a thin liquid coating (usually immobilized on fine particles of brick dust, silica, or the like) as the stationary phase. Such stationary phase materials are to be distinguished from those wherein a chemical bond (such as a covalent bond) is formed between the solid support and the active stationary phase. Liquid-partition processes, looked at schematically, do not differ much from the ion exchange-type process. In each case, the counter ion is carried on the packing. Once a major aspect of liquid chromatography, liquid-liquid partition process have been largely discarded, because drawbacks inherent in the system make it impossible to keep pace with the requirements of, and the refinements in, other areas of, liquid chromatography. E.g., it was difficult to achieve an adequate permanent fixation of the stationary phase to the base particles. Nevertheless, some investigators have placed an aqueous solution of a counter ion on the stationary phase. They then placed a sample of the material to be analyzed in a non-polar mobile phase which was passed through the counter-ion-bearing bed. There are a number of problems associated with such a process in addition to these problems inherently associated with liquid-liquid partition processes. For example, the sample had to be solubilized in a non-polar liquid (e.g., hexane) and this greatly reduced the potential use of the process.

In addition to the processes discussed above, there are procedures wherein an ester, a sulfonamide or some other compound was first formed by reaction of acid or base for which an analysis was desired: this derivative compound would be dissolved in a carrier liquid and subjected to liquid chromatography thereby facilitating the analysis of the acid or base.

It has remained a problem to achieve a widely-applicable process for analysis of ionic materials by liquid chromatography.

SUMMARY OF THE INVENTION

Therefore, it is an object of the present invention to provide an improved process for the chromatographic separation of ionic species.

It is a particular object of the invention to provide a chromatographic process for separation of ionic species which process has greater versatility, allows extended lifetime of columns, and can be utilized in most situations without recourse to gradient elution procedures.

Another object of the invention is to provide an improved process for analysis of compositions containing quaternary amines or compounds exhibiting like ionic characteristics.

A further object of the invention is to provide an improved process for analysis of compositions containing sulfonic acids or compounds exhibiting like ionic characteristics.

Still another object of the invention is to provide a packaged, functionally interrelated kit, system to facilitate the implementation of the improved process of the invention.

It is another object of the invention to provide a process for analyzing for ionized compounds which process can be utilized with stationary phases characterized by any of a number of physical properties (i.e. oliphicity or hydrogen-bonding strength) capable of differentiating between counter-ion-complexed characterizing ions of ionizable compounds.

Other objects of the invention will be obvious to those skilled in the art on reading this disclosure.

The above objects have been substantially achieved by development of a process wherein counterions of sufficient size to promote retardation of ionizable species (by interaction of complexes formed of said counterions with a characterizing ion of said ionizable species) are placed in a polar carrier liquid with the ionizable-species-containing sample to be subject to analysis. It is particularly surprising how little counter ion is required to achieve a useful analytical separation. The stationary phase is advantageously a so-called bonded phase material, such as silica-base powder, onto the surface of which has been reacted an aliphatic chain e.g., a $C_{18}$ chain or a cyano group, depending on the characteristic of the ion pair which one wishes to use as a basis for carrying out the separation.

The procedure whereby the mobile phase is more polar in character than the stationary phase and is consequently made suitable to carry a counter ion is referred to herein as a "reverse phase" process.

Among the preferred species of counter ions used in analysis of acids are the quaternary ions like tetrabutyl ammonium ion, and the tetrapentyl ammonium ion, and the like.

Among the preferred species of counter ion-bearing compounds used in analysis of acids are heptane sulfonic acid, octane sulfonic acid, and pentane sulfonic acid, and dioctyl sodium sulfosuccinate, and the like. Organic phosphates, perchlorate, and organic sulfates are also useful.

The counter ions are typically useful in a 0.005 molar concentration within the mobile phase. In some applications, it may be found desirable to increase or decrease the concentration to achieve optimum results.

Among the compounds advantageously analyzed by the process of the invention are such organic acids as sulfonic acids, carboxylic acids, organic amines including quaternary amines, and amphoteric compounds such as some of the amino acids. It should be realized that hybrid systems, e.g., those containing acids, bases, amphoteric compounds and/or neutral compounds can be analyzed by the process of the invention.

For the purpose of this application, strong acid will be defined as those acids having a $pK_a$ of 2 or less. A weak acid will be considered to have a $pK_a$ of greater than 2.

For the purposes of this application, a strong base will be considered to be a base with a $pK_a$ of 8 or more; and a weak base will be considered to have a $pK_a$ of less than 8.

The mobile phase, i.e. the phase carrying the sample and the phase in which the counter ion is introduced into the column, advantageously consists of a polar liquid, often one comprising both water and an organic solvent such as methanol, acetonitrile, tetrahydrofuran or the like. The mobile phase is buffered to a pH level sufficient to maintain the compounds to be selectively retarded in a useful, preferably maximum, state of ionization.

A typical bonded-phase packing is silica reacted with an organic material to bear 18-aliphatic group thereon. Such a packing material is sold by Waters Associates under the trade designation Bondapak $C_{18}$/Porasil B and Bondapak/Corasil and Bondapak $C_{18}$. Such a packing material may be used in either ionic or non-ionic applications. However, all embodiments of this invention involve ionic applications, i.e. analysis of samples which comprise ionizable compounds. Ionic applications may be generalized as being of two kinds: analysis of compositions for (1) weakly-ionized compounds and (2) for strongly-ionized compounds.

Heretofore, weakly-ionized systems to be analyzed have been investigated by use of a so-called "ion-suppression" procedure. Thus, when chromatographing weakly-ionized acids, the mobile phase would be buffered with acid to a very low pH in an attempt to further suppress the already weak ionization tendency of the acid, i.e. to drive the equilibrium of the

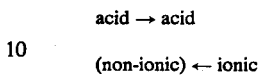

relationship strongly toward the acid (non-ionic) side. Likewise when chromatographing a weak base, the mobile phase would be buffered to a high pH level thereby suppressing the ionization of the basic compounds in the sample to be analyzed.

Thus, it is seen that the process of the present invention would, as to weakly-ionized materials, reverse the procedure whereby ion formation is suppressed and, instead, provide a buffering action which will markedly increase the ionization of ionizable components of a sample to be analyzed. In many cases, this ionization can be used to markedly improve the analytical procedure.

Before further discussing this improvement in analysis of compositions weakly-ionizable components, application of the invention to samples containing strongly-ionized components are discussed: In general, the ionization of strongly-ionizable acids and bases, is difficult or impractical to suppress using buffers with bonded phase column packing materials. According to the invention, when a sample to be analyzed contains a strongly-ionizable base, that sample is introduced into the column in the polar carrier liquid (e.g. a mixture tetrahydrofuran and water) in the presence of a counter ion-bearing material such as heptylsulfonic acid. The heptylsulfonic radical forms a complet with the strong base, say an amine, as follows:

In the following equations R is a characterizing ion and $C_7H_{15}SO_3^-$ is a counter ion:

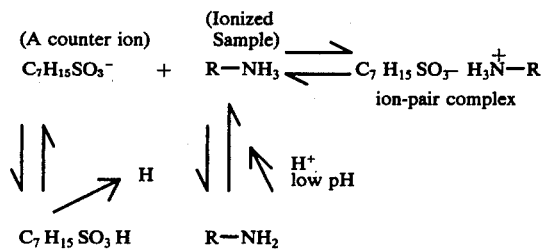

The above equilibrium are sufficiently rapid that, where the concentration of ionized sample is small compared to that of the counter ion, a single peak elutes for a given injected compound. The aliphatic-bearing complex is sufficiently oleophilic to be attracted to the aliphatic $C_{18}$ bonded to the stationary phase of the chromatography packing. In this case, an increase in retention volume is observed from an injection of ionic sample components upon addition of the counter ion bearing compound, i.e., the salt to the mobile phase, as compared to the retention volume(s) obtained under identical conditions in absence of the counter-ion salt. The degree to which retention is increased will depend on 1) the attraction of the ion-pair complex for this stationary phase, and 2) the extent to which formation of the complex takes place.

The degree of attraction of the ion-pair complex for the stationary phase will vary with 1) different sample characteristizing ions, and 2) different counter-ions. In a given chromatogram, wherein the latter is constant, separation occurs between different sample ions. The nature of the separation may then be changed by changing the type of counter-ions and repeating the chromatographic procedure.

The extent to which ion-pair complex formation takes place is manifested in a chromatogram. Thus, when the counter-ion is varied, larger changes in relative retention volumes are observed for sample components that exist to a greater extent as the ion-pair, as compared to those sample components which exist to a lesser extent as the ion-pair. The extent to which ion-pair formation takes place may vary with such factors as 1) nature of the sample 2) pH of mobile phase, 3) amount of sample, 4) concentration of counter-ion and 5) type of counter-ion.

From what has been set forth above, it may not be apparent that the mobile counter ion approach, i.e. the reverse phase approach, has any particular advantage in those systems wherein no presence of strong acids or strong bases interferes with the ion suppression processes. The following material is intended to explain an important utility of the process of the invention even when it is used to analyze samples containing only weakly-ionizable components.

In all chromatographic work, there is a balance to be maintained between (a) the time required to analyze a given sample and (b) the separation as it is manifested as a function of time on a chart. For example, if two chemical compounds flow very quickly through a column and emerge together, no analysis is possible. On the other hand, if the two compounds are so different with respect to their interaction with the packing that one emerges within a minute or two and the other emerges several hours later, an extremely good analysis is possible; but the desired analytical information will frequently be received too late to be useful and, in any event, the cost of machine time, etc., will be undesirably great.

An important aspect of the liquid chromatographic process of this invention is to optimize the analysis within a reasonable time. Among the tools traditionally presented to a chromatographer for use in obtaining optimization are (a) different types of packings, (b) different carrier solvents, and (c) solvent programming (i.e., gradient elution). It is most desirable to add a further, and very often more convenient, means to obtain this optimization. Use of a mobile counter ion does provide such a means. The use of this process with samples that contain weak acids is discussed as follows:

"Neutral compounds" as discussed herein are those that are not ionizable in the precise process being discussed. A wholly non-ionizable material, say benzene or sucrose in most polar media, is a neutral compound. Also, acids or bases which are not ionizable in the particular solvent, or at the pH of a procedure, are also neutral compounds. (Thus the ion-suppressed acids of the prior art would be neutral compounds for the purposes of this discussion; albeit, they are ionizable compounds to which the process of the invention can be advantageously applied.)

Were one to take a sample containing some neutral compounds and some weak acids, buffer the solvent phase to ionize the acids, and run the sample through an appropriate packing, say Bondapak $C_{18}$ packing, one would find that most all the ionized material would go through immediately (i.e., as fast as the carrier liquid could carry it). However, the neutral compounds would be delayed for varying lengths of time depending upon the particular interaction equilibrium between each neutral compound and the bonded $C_{18}$ component of the material. (As has been seen above, this procedure would differ from the ion suppression techniques because, in the ion suppression techniques, the acids would have been maintained in the neutral state, and they too would have been delayed for varying times depending on the exact equilibrium formed, as neutral compounds, with the selected packing and selected solvent.)

In any event, the only tools available to the prior art in attempting to optimize such an "ionized" process were the above-listed variations in packing; (In most liquid chromatography work, this includes changing the column; but, from a practical point of view, the particular column has already been optimized) or in changing the solvent; or in constantly changing the relative concentration of solvent during the analytical procedure. This latter technique is commonly used. When this so-called gradient elution technique is optimized, one might be able to reduce the time or increase the resolution of the analytical technique; but one usually would not be able to materially change the relative position of various sample components. Thus, for example, if one wished to analyze for a particular early-eluting neutral material and several late-eluting weak acids, one would have to wait for the late-eluting material and the entire analysis would require the attention of a chromatographer, and the use of the apparatus, for longer than would be desirable.

However, when one adds counter ions to a carrier solvent, one has an entirely different technique for regulating the speed at which the radicals characterizing the ionized compound to be detected come through the column. He may add a first counter ion, decide the retention volume of ionic compounds is too great or too small, and then use another counter ion, thus changing the degree of attraction of the ion pair complexes for the stationary phase, and hence changing the retention volume of the ionic sample components. This new flexibility in design of analytical procedures allows optimization of any of a number of process parameters; total time of a separation, time between elution of particular materials, or the complete separation of each of two distinct groups of compounds on the read-out chart.

Another example of the use of the invention with weak acids is typified by the analysis for ascorbic acid, (an ionizable compound characterized by such high water solubility that, even in the un-ionized state, it will not retain well on a $C_{18}$ column) and like compounds. Ion suppression, normally a suitable procedure when analyzing for a single weak acid or single weak base, is not advantageous for use with ascorbic acid, because the problem which it presents is not associated with its weakly-ionizing characteristic: the problems relate to its water soluble nature and hence excessive mobility on a reverse phase system in its neutral form. However, with reverse phase ion-pairing procedures of the invention, the ascorbic acid can be reacted with a counter ion to form a reversible complex which does not have an affinity for the packing material (say $C_{18}$) and sufficient retention time to be subjected to analysis.

Organic phosphates and such inorganic ionic materials as perchlorate ions may also be used as counterions.

In practice, the appropriate counter ion is merely mixed to provide an adequate, usually about 0.005 molar concentration, in the polar solvent and the chromatographic process is carried out as taught in this application.

It should also be understood that a plurality ion pairs can be formed with polyionic compounds like di-cations or tri-cations (e.g. Vinblastine, an alkaloid used in antitumor work). Moreover, the process of the invention can take advantage of different tendencies to ionize of different potential ionizable sites in the same molecular. For example, compounds tending to ionize under any chromatographic conditions include pyridoxine vitamins. At high pH, the aliphatic amine group of pyridoxamine is non-ionic but the phenolic hydroxyl is ionized. At low pH, the ring amine and aliphatic amine are ionic. At intermediate pH's, the aforementioned groups and phenolic hydroxyls all have a mixed ionic/non-ionic character. In spite of such difficulties, the process of the present invention is used to analyze vitamins of this type by adjusting the pH typical acid-bourne oleophilic counter ion to the mobile phase to form an ion pair with the amine.

Another important utility of the invention is the analysis for materials, say procaine, which are non-ionic in basic media but which also are unstable in basic media. With such a compound, prior art chromatographic processes are complicated by a tendency for such compounds to react (hydrolize in the case of procaine) in the chromatographic system. Using the process of the invention, the problem may be solved by adjusting the pH of the mobile phase to a condition wherein the compound is both stable and ionic, a pH of 5 in the case of procaine.

Some acids will present similar problems. For example, separation of prostaglandin $B_2$ and $B_1$ compounds have alcohol groups on asymmetric centers, the exact disposition of which is believed critical in their diverse biological activity. While these compounds are non-ionic under acidic conditions, they are subject to epimerization in such an ion-suppressed media. However, the process of the invention provides a means whereby one can select a mobile phase of pH (wherein the prostaglandin compounds are both ionic and steriochemically stable) and an appropriate cationic counter-ion 0.002 moles of tetrapropyl ammonium ion, for example, introduced as the hydroxide into a 200/300 water/methanol carrier liquid is suitable.

Most of the examples presented herein disclose use of a stationary phase comprising an octadecyl group chemically bonded to silica. However, it should be realized that this particular material was selected for illustration only, because it was readily available and is broadly useful when one wishes to demonstrate the process with a broad range of chemicals which can be solubilized in a polar mobile phase. It will be realized that most of the separations disclosed using the $C_{18}$-type material are necessarily based on differing lipophilicity differences of the ion-counterion complexes.

Nevertheless, it should be specifically understood that wholly analogous separations can be carried out according to the process of the invention by using an immobile phase which is selective not on the basis of lipophilicity, but on the basis of hydrogen-bonding strength or some other such physical characteristic. Cyano-group bearing silica (e.g. such as is available from Waters Associates under the trade designation Bondapak CN) is one such material which can be used to effect separations according to hydrogen-bonding strength of the stationary phase.

ILLUSTRATIVE EXAMPLE OF THE INVENTION

In order to point out more fully the nature of the present invention, the following specific examples are given as illustrative embodiments of the present process and products produced thereby.

EXAMPLE 1

This Examples illustrates the analysis of ascorbic acid by a reverse phase ion-pairing process and compares the analysis with analysis carried out by other procedures.

Ascorbic acid is typical of compounds so polar, even in non-ionic form, that they have little affinity for lipophilic stationary phase and elute with the solvent (mobile phase) portion.

A Model ALC 202 Liquid Chromatography equipped with a Model 6000 pump and U6K injector (all commercially available from Waters Associates of Milford, Massachusetts) was used for this Example. Column effluents were monitored with a 254 nm ultraviolet detector. The flow rate of liquid through the column was about 3.0 ml/min. A 30 cm × 4 mm i.d. a pre-packed column sold under the trademark $\mu$ Bondapak $C_{18}$ by Waters Associates was used. The $\mu$ Bondapak $C_{18}$ packaging has a mono-molecular layer of octadecyltrichlorosilane chemically bonded to porous silica beads which have an average particle size of 10 microns.

Ascorbic Acid, a Reference Standard, was obtained from the U.S.P. Reference Standards Laboratory. The mobile phase, was prepared as follows: Tridecyl ammonium formate ($2.0 \times 10^{-3}$M) was added to deionized water (300 ml), and the pH was balanced to 5.0 with 1% formic acid and NaOH. This solution was mixed with an equal volume of methanol and deaerated by vacuum.

Samples of ascorbic acid in phosphate buffer (pH 5.0) were prepared to contain 0.5, 1.0, 2.5, 5.0, 7.5, 10.1 and 15.0 mg. respectively, of ascorbic acid/100 ml. Aliquots (20.0 ul) of these solutions were injected into the chromatographic system, and the resulting peak areas were plotted against concentration for the calibration curve.

Sample Preparation of Pharmaceutical Samples

One dosage unit of the sample was homogenized and transferred to a 100 ml volumetric flask with the aid of phosphate buffer pH 5.0 (50ml). The flask was shaken for two minutes and diluted to volume with the buffer solution. The resulting mixture was filtered, the first 10 ml of filtrate discarded, and an aliquot of the remainder diluted to a final concentration of 5.0 mg/100 ml based on labeled claim. A 20 microliter-portion of this solution was injected, the resulting peak area determined, and the quantity of ascorbic acid in the sample calculated by reference to the previously derived calibration curves.

Sample Preparation of Foods

A 100 gm sample was homogenized with an equal weight of 6% $HPO_3$. A portion (10–30 gm), accurately weighed of this slurry was transferred to a 100 ml volumetric flask and diluted to volume with $HPO_3$. When necessary, this solution was further diluted to a final concentration range of 0.5–7.5 mg/100 ml. Samples were then treated and the ascorbic acid content was determined as above.

Although minimal sample preparation was used, the following Table B is indicative of the advantageous analytical results achieved in comparison to other analytical procedures.

Table B

Comparative Analysis of Ascorbic Acid In Selected Food Products

| Sample | Composition | Ascorbic Acid Content, mp per 100 gm | | |
|---|---|---|---|---|
| | | Chromatographic | Titrimetric | Turbidimetric |
| 1 | Tomato Juice | 14.4(3.22) | 19.2(1.64) | 14.2(5.21) |
| 2 | Lemon | 34.0(2.50) | 34.5(1.24) | 34.6(4.04) |
| 3 | Asparagus | 19.4(2.40) | 20.2(1.55) | 19.0(4.33) |
| 4 | Green Peas | 6.3(3.10) | 9.2(1.42) | 6.9(4.86) |
| 5 | Fruit Drink | 24.9(2.76) | 27.0(1.22) | 26.4(4.11) |
| 6 | Red Beets | 8.3(3.02) | 21.4(9.40) | 9.20(4.74) |
| 7 | Pineapple | 16.4(3.47) | 18.1(2.44) | 17.4(5.21) |
| 8 | Grapefruit Juice | 15.2(3.44) | 31.0(1.94) | 20.8(7.20) |
| 9 | Infant Formula | 12.3(3.76) | 34.3(2.00) | 19.7(6.46) |

Parenthetical numbers are indicative of per cent standard devication where N=8.

It is to be noted that over 300 food and multivitamin extracts have been examined with no discernible change in chromatographic performance of the column. The column was flushed daily with methanol, a wash technique recommended by a supplier. This wash technique apparently removes any lipophilic substances from the column with no detectable reduction in column efficiency.

The following table illustrates the use of various counter ions with the retention volume of ascorbic acid containing samples:

| Counter-ion bearing compound | RV (ml) |
|---|---|
| None | 1.8 |
| Tetramethylammonium hydroxide | 1.9 |
| Tetraethylammonium hydroxide | 2.3 |
| Tetrapropylammonium hydroxide | 4.6 |
| Tetrabutylammonium hydroxide | 7.9 |
| Tetrahexylammonium hydroxide | 10.0 |
| Tridecylammonium formate | 11.35 |

The counterion was present in a quantity of $1.0 \times 10^{-3}$ moles in a mobile-phase solvent of methanol (300 ml) and water (300 ml). Flow rate was 2.5 ml per minute. Retention volume is defined as the volume eluting from the column between sample input and sample outlet.

The titration described in Table B was carried out with 2,6-dichlorophenolindophenol. It is a widely used procedure, but it is probably inferior to the more selective turbidimetric procedure. Even the latter procedure suffers interference from stannous ion. It is this interference that accounts for its abnormally high results in some cases, e.g. in grapefruit juice and infant formula analysis. The chromatographic process of the invention requires less sample preparation than does the turbidimetric procedure.

Table C illustrates the experimental use of the invention in analysis of commercial vitamins. It is probably more accurate than the visually-monitored titration procedure.

TABLE C

| Commercial Multi-Vitamin Preparations | | Ascorbic Acid | | |
|---|---|---|---|---|
| Dosage Form | Labeled Constituents | Labeled/ Dosage Unit | Found [a] | |
| | | | Chromatographic | Visual Titration [b] |
| Capsule | 9 vitamins, 8 minerals and extractives of yeast and Streptomyces fermentation | 50 mg | 102.3(2.16) | 101.74(2.44) |
| Capsule | 9 vitamins and 6 minerals | 250 mg | 108.4(2.49) | 110.7(2.75) |
| Tablet | 10 vitamins | 333 mg | 103.7(1.78) | 104.6(2.21) |
| Chewable Tablet | 10 vitamins, fluoride and fruit flavor | 50 mg | 98.4(2.00) | 99.2(2.64) |
| Liquid | 7 vitamins, 2 minerals and dessicated liver | 100 mg | 97.6(2.13) | 99.4(7.46) |
| Drops | 10 vitamins, flavoring and coloring agents, and preservatives | 50 mg | 102.4(2.76) | 104.4(6.42) |

[a] Percent recovered (% standard deviation), N = 8
[b] According to United States Pharmocopedia XIX

EXAMPLE 2

This Example discloses the simultaneous analysis of nicotinic acid (an amphoteric material) and nicotinamide a weak base. Nicotinic acid presented a particular problem because of its tendency to ionize over a broad range of pH values.

Nicotinic acid presented a particular problem because of its tendency to ionize over a broad range of pH values. Bonded stationary phases are relatively stable at a low pH, e.g. below 2 and less stable at a pH over 8.

Because of this and the $pK_a$ of a nicotinamide, a low pH value was selected for the present example. This suppressed ionization of the carboxyl moiety of nicotinic acid and protonated the hetero nitrogen of both the acid and amide compounds. The same kind of column used in Example 1 was used in this Example. Flow rate was 2.5 ml per minute.

Nicotinamide and nicotinic acid were obtained as U.S.P. Reference Standards. Dioctyl sodium sulfosuccinate (DOSS), camphorsulfonic acid, and sodium hexanesulfonate (all counter-ion-bearing acids) were obtained from commercial suppliers and used as received. Commercial multi-vitamin preparations were obtained from local pharmacies.

Preparation of the Mobile Phase

Solvent systems were prepared by first dissolving DOSS in distilled water (300 ml) to a 2.0 × 3$^{-3}$ M concentration. This solution was adjusting the pH to 2.5 with 10% formic acid solution, and combining the resulting solution with methanol (300 ml). The mobile phase was deaerated prior to use by the brief application of a vacuum.

A homogenized vitamin preparation (one dosage unit) was placed in a volumetric flask (100 ml) with phosphate buffer solution pH 6.0 (50.0 ml) and shaken for five minutes. Buffer solution was added to volume, and after the flask was shaken, particulate matter was allowed to settle. The sample was filtered when required, and the first 10–15 ml of filtrate was rejected. The solution was then diluted to a concentration of 2.5 mg/100 ml of nicotinamide or 0.75 mg/100 ml of nicotinic acid.

The pH of the aqueous component of the mobile phase was adjusted to 2.5, at which the hetero-nitrogen of nicotinic acid and nicotinamide are protonated, and carboxylate ionization (of nicotinic acid) is suppressed. Addition of the appropriate sulfonate salt to the mobile phase then results in retention of both nicotinic acid and nicotinamide, with nicotinic acid less strongly retained because of its greater polarity.

Using this chromatographic system (FIG. 1) standard curves were prepared daily for ten days, and the standard deviation of the slope of the curve for nicotinamide was 1.57% and for nicotinic acid 1.69%. The average correlation coefficient for nicotinamide calibration curves was 0.996 and for nicotinic acid 0.998. The average y-intercept was −3.24 integrator units for nicotinamide and +4.70 for nicotinic acid. These data indicate that the procedure is amendable to use of a single-point standard.

Accuracy and precision of the proposed chromatographic procedure was investigated by analysis of laboratory-prepared samples (Table II), and results were also compared with those of the standard procedure at Page 120 of *The United States Pharmacopedia*, 19th Revision (Mack Publishing Company, Easton, PA 1975). In each case, precision of the liquid chromatographic procedure is greater than that of the standard procedure. This may be attributed to the less complicated sample work-up required by the process of the invention. It should also be noted that the two methods compare quite favorably in terms of the determination of the combined quantity of nicotinic acid and nicotinamide.

The data presented in the following table is indicative of the performance of the method The following table is indicative of the retention volumes of nicotinamide and nicotinic acid with various other counter ions of the sulfonate (DOSS is a sulfonate) type.

| Solute [a] | | Nicotinamide [b] |
|---|---|---|
| no counter ion | 1.8 | 1.8 |
| Sodium Heptane Sulfonate | 3.0 | 2.8 |
| Sodium Camphor Sulfonate | 6.2 | 5.6 |
| Sodium Dioctyl Sulfosuccinate | 10.5 | 9.0 |

[a] 2 × 10$^{-3}$ M of the salt was dissolved in distilled water (300 ml), the pH was adjusted to 2.5 with 10% formic acid solution, and methanol (300 ml) was added.

[b] Retention Volume in ml with a flow-rate of 3.0 ml/min.

EXAMPLE 3

This example demonstrates an analysis of a sulfonic acid dye material known as Tartrazine and sold under the art-recognized terms FD and C Yellow 5.

The apparatus used was the same as that used in Examples 1 and 2 except effluent monitoring was carried out with a 280-nm U.V. detector. Samples of Tartrazine, Pyrazolone T, and sulfanilic acid were supplied by Warner-Jenkinson Company. Tetrabutylammonium hydroxide (TBAH) was used as a 10% solution in methanol, while tetraethylammonium hydroxide (TEAH) and tridecylamine (TDA) were used as 10% solutions in water.

Methanol (400 ml), deionized water (400 ml) and formic acid (1.0 ml) was used as the mobile phase solvent mixture with varying amounts of the substances listed in Table 1.

Standard Solutions. Solutions of sulfanilic acid, Pyrazolone T, and 3-nitro salicyclic acid were prepared in methanol water (50/50) to contain 0.10 mg/ml. Solutions of m-chlorobenzoic acid (45.0 mg/ml) and tartrazine (10.0 mg/ml) were also prepared.

Sample Solution. A sample of dye (1000.0 mg) was weighed accurately and transferred to a 100-ml volumetric flask. Water (50 ml) was added, the flask shaken until solution was achieved, and methanol was added to volume. An aliquot (1.0 ml) of this solution was mixed with 1.0 ml each of the m-chlorobenzoic acid and 3-nitro-salicyclic acid solutions. An appropriate amount (2–6 microliters) of this solution was injected into the chromatographic system.

Analysis of components present in the dye was performed under the conditions given under FIG. 1. The concentration of constituents present in the sample was determined by peak area ratios with the areas of sulfanilic acid and Pyrazolone T measured relative to 3-m-chlorobenzoic acid, and tartrazine relative to 3-nitrosalicyclic acid.

| Analysis of Laboratory-Prepared Samples[a] by Liquid Chromatography and the Cyanogen Bromide Procedure | | | | | |
|---|---|---|---|---|---|
| Nicotinic Acid | | Nicotinamide | | Total | |
| Added | % Recovery [b] LC | Added | % Recovered [b] LC | Added | % Recovered U.S.P. |
| 1.0 | 100.3(1.46) | 2.0 | 98.9(1.55) | 3.0 | 98.0(3.14) |
| 5.0 | 99.7(1.74) | 20.0 | 100.4(1.76) | 25.0 | 97.7(2.46) |
| 1.0 | 98.6(1.85) | 50.0 | 101.2(1.94) | 51.0 | 96.8(3.44) |
| 10.0 | 98.9(1.40) | 100.0 | 99.9(1.63) | 110.0 | 103.2(2.16) |
| 50.0 | 100.8(1.21) | 2.0 | 100.5(1.40) | 52.0 | 100.4(2.96) |
| 100.0 | 101.2(1.81) | 20.0 | 101.2(1.84) | 120.0 | 101.2(2.84) |
| 50.0 | 98.2(1.64) | 50.0 | 100.5(1.77) | 100.0 | 99.2(3.10) |

[a] Prepared according to the formula for Decavitamin Capsules, U.S.P. XIX

[b] % Recovery (% Standard Deviation), N = 8

Accuracy and precision of the procedure were determined with laboratory prepared samples of known composition, and the results are summarized in Table II. Use of the lipophilic packing material in combination with the addition of selected salts to the mobile phase gave sufficient selectivity to effect the separation (Table 1). When small quantities of formic acid are added to the mobile phase, tridecylamine may serve in the same capacity as the quaternary ammonium salts as a counter-ion bearing material.

It appears that the mechanism for such a separation depends on the reversible formation of ion-pairs within the chromatographic system and separation of the constituents on the basis of differences in the lipophilicity of the ion-pairs so formed. Thus, the more lipophilic the cationic constituent of the salt, the longer the retention time of the sulfonic acid derivatives on the lipophilic column.

to facilitate the simultaneous determination of the two uncombined intermediates.

Table II.

| | Quantitative Data Derived from Laboratory Prepared Samples | | | | | |
|---|---|---|---|---|---|---|
| | Sulfanilic acid | | Pyrazolone T | | Tartrazine | |
| Sample | Added, mg | Found[a] | Added, mg | Found[a] | Added, mg | Found[a] |
| 1 | 0.05 | 98.4 (2.14) | 0.05 | 101.4 (1.63) | 100.0 | 100.3 (0.54) |
| 2 | 0.10 | 99.7 (1.41) | 0.10 | 100.6 (0.82) | 100.0 | 100.1 (0.69) |
| 3 | 1.00 | 100.2 (0.54) | 1.00 | 100.7 (0.21) | 98.0 | 99.7 (0.52) |
| 4 | 10.0 | 98.4 (1.46) | 10.0 | 101.4 (1.04) | 80.0 | 98.7 (1.50) |
| 5 | 10.0 | 99.7 (1.26) | 0.05 | 101.8 (1.51) | 90.0 | 100.8 (0.06) |
| 6 | 0.05 | 100.8 (2.44) | 10.0 | 98.4 (1.69) | 90.0 | 98.2 (1.64) |

[a]Percent recovered (% standard deviation), N 10.

Table 1.

Effect of Selected Counter Ions on the Retention Volume[a] of Tartrazine and Its Synthetic Intermediates

| Moles | Sufanalic acid, ml | Pyrazolone T, ml | Tartrazine, ml |
|---|---|---|---|
| TEAH ($1.0 \times 10^{-3}$) | 2.2 | 2.2 | 3.4 |
| TBAH ($3.0 \times 10^{-3}$) | 2.4 | 3.0 | 6.0 |
| TDA ($3.0 \times 10^{-4}$) | 8.9 | 13.0 | >90 |
| TBHA + TDA ($3.0 \times 10^{-3}$)($3.0 \times 10^{-4}$) | 4.5 | 6.5 | 60.0 |
| TBHA + TDA ($3.0 \times 10^{-3}$)($1.50 \times 10^{-4}$) | 4.2 | 5.5 | 14.0 |
| TBAH + TDA ($3.0 \times 10^{-3}$)($0.00 \times 10^{-4}$) | 3.2 | 4.0 | 7.1 |

[b]Flow rate of 0.9 ml/min.

It is interesting to note (Table 1) that the retention times of constituents in mobile phases obtained by mixing individual solutions containing different salts generally appear to be closely related to their retention times in the individual solutions. This relationship makes selection of the optimum mobile phase for the analysis rational and rapid.

Initially, the separation was monitored at 254 nm. However, at this wavelength, the molar absorptivity of sulfanilic acid is much greater than that of Pyrazolone T. The 280-nm monitor for which the equimolar response is approximately equivalent, was used therefore

EXAMPLE 4

This Example relates to the simultaneous analysis of non-ionic and ionic compounds exemplified by hydrocortisone and hydrocortisone phosphate. The former compound is considered an impurity in preparations of injectable hydrocortisone phosphate ester.

Using a 420:500 ratio of methanol and water as the mobile phase hydrocortisone is rapidly separated from methyl and propyl paraben.

Then quaternary ammonium compounds (counter-ion bearing compounds) are successively added to the selected carrier liquid to form a series of mobile phase liquids. The pH of each is buffered just below 8.0. This allows one to select an appropriate counter-ion bearing material. An excellent analytical separation of such hydrocortisone compounds was achieved using tetrapentyl ammonium hydroxide (0.01M) in methanol and mixing 20 ml this methanol with 500 ml of Water to form the mobile phase.

The separation is advantageously carried out in a column filled with $\mu$ Bondapak particles as has been described in Examples 1-3.

Excellent separations are achieved at flow rates of about 3 ml per minute.

EXAMPLE 5

The following table indicates the retention volumes for various nitrogen compounds with various mobile phases.

Table 2:

| | Retention Volumes for Various Nitrogeneous Substances [1] | | | | |
|---|---|---|---|---|---|
| Solvent | Tubocurarine | Edrophonium | $\alpha$-Methyldopate | $\alpha$-Methyldopa | Propranolol |
| Methanol(300) $H_2O$ 300[2] | 3.60 ml | 3.20 ml | 3.68 ml | 3.36 ml | 5.60 ml |
| Methanol(300) + CSA[4] $H_2O$(300) | 6.6 | 4.32 | 5.12 | 3.8 | 12.3 |

Table 2:-continued
Retention Volumes for Various Nitrogenous Substances [1]

| Solvent | Tubo-curarine | Edro-phonium | a-Methyl-dopate | a-Methyl-dopa | Propran-olol |
|---|---|---|---|---|---|
| Methanol(400) + DOSS 39 H$_2$O(200) | 8.0 | 7.5 | 7.0 (A) | 17.9 | |

[1] Conditions: 2.0 ml/min on C$_{18}$ µBondapak
[2] In each case, the pH of the aqueous solution was adjusted to 3.0 with formic acid and/or dilute sodium hydroxide solution.
[3] Asymmetric
[4] Camphorsulfonic Acid
[5] Nitrogen compound in mobil phase was about 20 micrograms in each case.

One skilled in the art on reading this disclosure, can readily understand how this data can be applied to practical analysis problems. In the absence of a counter ion, propranolol is the only compound exhibiting affinity for the stationary phase. This is indicative of the lipophilicity of the propanolol cation.

When DOSS is added to the mobile phase, the retention volume of propranolol increase markedly because of the still greater lipophilicity of the ion pair formed by the DOSS-introduced ion and the propranolol cation. Tubocurarine is a di-cation and forms a "poly" ion-paired compound with the DOSS; thus, its retention also increases markedly. The other nitrogenous materials form monocationic ion pairs and have substantial increases in retention time, albeit less than the propranolol or tubocurarine.

When CSA is used as the counter-ion-bearing compound, it will be noted that the elution order of propranolol and tubocurarine are reversed. Apparently, formation of a di-ion pair does not compensate for the lower lipophilicity of the propranolol cation.

EXAMPLE 6

A mixture of those dyes known as Yellow 6; Yellow 5; Blue 2, and Blue 1, and Red 40 were subject to analysis according to the process of the invention. The stationary phase was that sold under the trademark µ Bondapak CN by Waters Associates. The mobile phase was 400/200 water/methanol. The selected counter-ion bearing material was methylamine (0.003 moles in 600 ml of mobile phase). The mobile phase was adjusted to pH4. Flow rate through the column was 2.0 ml per minute and a 254 nm UV detector was utilized to detect the concentration peaks of the liquid leaving the column.

EXAMPLE 7

To illustrate how ion-bonding, reverse phase process can be utilized to achieve a different order of elution of compounds the following two processing systems, 7A and 7B, are disclosed.

Both systems have the following comment parameters:

Packing: µ Bondapack/C$_{18}$
Column: 4mm × 30 cm
Solvent: Methanol/Water (50/50) with 0.005M concentration of aliphatic sulfonate and 1% HOAC
Sample: Same antihistamines -decongestants containing small quantities of
  Maleic acid, an acid
  Phenylephrine, a base
  Phenylpropanolamine, a base
  Phenacetin, (a neutral cpd)
  Naphazoline, (a base)
  Pyrilamine, a base
Flow Rate: 2 ml/min 7A: The alphatic group of the counter ion was heptyl and the compounds eluted from the column in distinct peaks in the order listed above.

7B: The aliphatic counter ion was pentyl: In this situation, the naphazoline eluted before the phenacetin. The reason is that the heptyl counter ion in combination with the characterizing naphazoline radical was less aleophilic, interacted less with the aliphatic coating bonded to the silica, and consequently eluted more quickly from the column.

It should be obvious from the above examples that the use of mobile counter ions in liquid chromatography can be of important utility in analysis of a vast number of compositions containing ionizable materials. Particular advantage is noted for optimizing the simultaneous analysis of ionic and nonionic compounds, or of acids and bases; the analysis of strong acids or strong bases; the analysis of amphoteric compounds; and the analysis of highly water-soluble compounds like ascorbic acid.

What is claimed is:

1. In liquid chromatographic processing of compositions containing ionizable compounds, wherein the sample to be processed is carried in a mobile liquid phase which is passed through a porous packing material, in intimate physical contact therewith, and wherein said packing material has a chemical group chemically bonded onto the surface of said packing, the improvement comprising the steps of:
   1. dissolving a counter ion, to a characterizing radical of at least one of said ionizable compounds, in a polar mobile liquid;
   2. forming a reversible complex between said counter ion and at least one said characterizing radical, said complex being soluble in said polar liquid;
   3. passing said complex through said packing for a time sufficient that chemical attraction between said complex and chemically-bonded group causes substantial retardation of the complex through the column; and
   4. analyzing the effluent of said column.

2. A process as defined in claim 1 wherein a said complex is formed between a strong acid bearing a counter-ion and a strong base bearing a characterizing radical.

3. A process as defined in claim 1 wherein a said complex is formed between a strong base bearing a counter-ion and a strong acid bearing a characterizing radical.

4. A process as defined in claim 1 wherein said composition containing ionizable compounds comprises both acids and bases bearing characterizing radicals, and said analyzing step includes analysis of at least one acid and at least one base.

5. A process as defined in claim 1 wherein a said complex is formed between a characterizing radical of highly-water-soluble weak acid or a highly-water-soluble weak base and a counter ion for said characterizing radical.

6. A process as defined in claim 5 wherein said complex is formed between an ascorbic characterizing radical and an aliphatic counter ion.

7. A process as defined in claim 1 wherein some characterizing radical is derived from a sulfonic acid compound in the composition being subjected to analysis.

8. A process as defined in claim 1 wherein said characterizing radical is derived from a quarternary amine compound in the composition being subjected to analysis.

9. A process as defined in claim 1 wherein said chemical group bonded to the surface of said packing is aliphatic.

10. A process as defined in claim 1 wherein said chemical group bonded to said packing has a strong hydrogen-bonding capacity.

11. A process as defined in claim 10 wherein said chemical group bears a —CN radical.

12. A process as defined in claim 1 wherein the relative sequential position of at least one characterizing radical, in a column effluent comprising a number of chemical compounds, is shifted by formation of a said complex formed between a said characterizing radical and a counter ion for said characterizing radical.

13. A process as defined in claim 1 where at least one said characterizing radical is obtained from ionization of an amphoteric compound.

14. A process as defined in claim 1 wherein at least one said ionizable compound to be subjected to analysis is chemically unstable, in the form in which it is introduced into the column in the absence of a said counter ion, but which forms a complex with a said counter ion, thereby providing means to analyze for said ionizable compound.

15. A process as defined in claim 3 wherein said base is a quaternary ammonium compound.

16. A process as defined in claim 2 wherein said acid is a sulfonic acid.

17. A process as defined in claim 14 wherein said compound to be analyzed is unstable in non-ionized form.

* * * * *

UNITED STATES PATENT OFFICE
CERTIFICATE OF CORRECTION

Patent No. 4,042,327      Dated August 16, 1977

Inventor(s) William G. Haney et al.

It is certified that error appears in the above-identified patent and that said Letters Patent are hereby corrected as shown below:

Column 8, line 28, "packaging" should read -- packing --.

In the expression "N=8", which appears in Column 10 as footnote "a" to Table C and footnote "b" to the table which appears in Column 11, the numeral should appear in regular type face rather than as a superscript numeral.

Column 15, Table 2, the numerals "8.0"; "7.5"; "7.0(A)" & "17.9", should be deleted to appear as

-- 39     8.0     7.5     7.0(A)     17.9 --;

Same Table 2, first column, line 3, delete "39".

Signed and Sealed this

Thirteenth Day of December 1977

[SEAL]

Attest:

RUTH C. MASON      LUTRELLE F. PARKER
Attesting Officer      Acting Commissioner of Patents and Trademarks